United States Patent Office 3,348,817
Patented Oct. 24, 1967

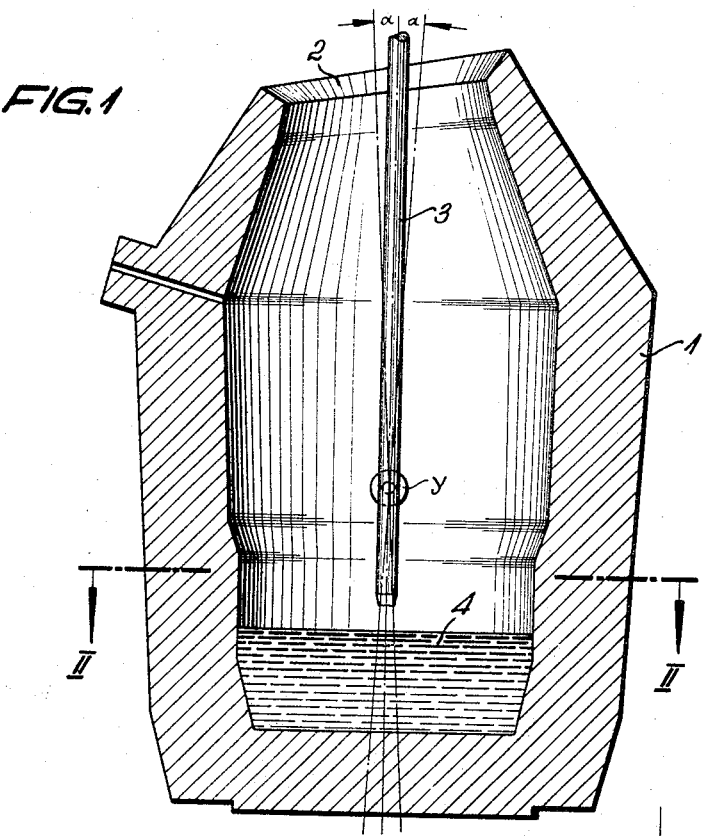
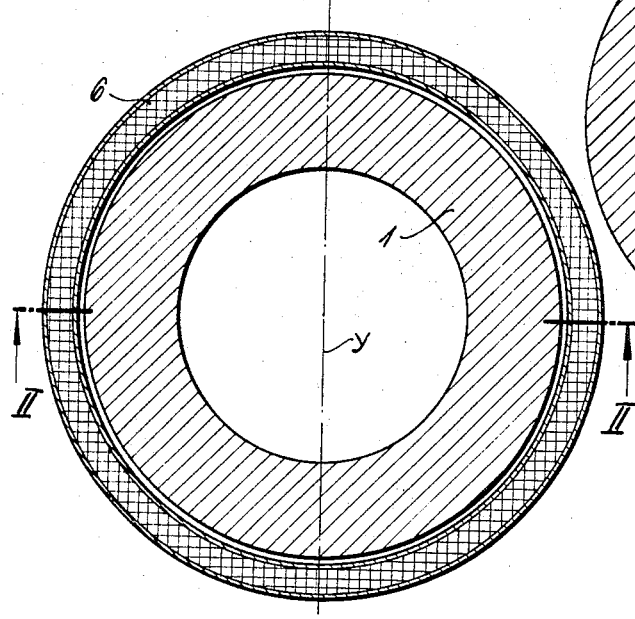
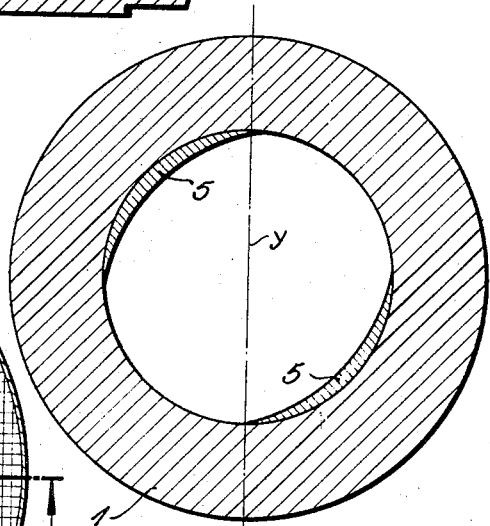

3,348,817
PROCESS AND APPARATUS FOR INTERMIXING LIQUIDS, MORE ESPECIALLY METAL SMELTS
Erich H. K. Mueller and Bernhard Osann, Wolfenbuettel, and Christian Mueller, Salzgitter-Lebenstedt, Germany, assignors to Huettenwerk Salzgitter Aktiengesellschaft, Salzgitter-Watenstedt, Germany, a corporation of Germany
Filed Sept. 24, 1963, Ser. No. 311,066
11 Claims. (Cl. 259—72)

The present invention concerns a process for intermixing liquids, more especially metal smelts, and/or mixing liquids, more especially metal smelts, with other substances in an agitated vessel. The invention also concerns a vessel for carrying out such a process.

Heretofore it was not possible in steel converters or similar vessels to produce a rotary movement of the bath about the vessel axis by means of an individual horizontal pivoted axis as is the case in known shaking ladles mounted on eccentrics. Such a procedure in a converter or the like vessel by means of a single pivotal axis would signify a considerable advantage, because thereby certain reaction procedures, such as e.g. oxygen refining of crude iron to steel could be improved. Furthermore by the rotary movement produced of the bath in such vessels it would be possible to carry out all the mixing and reaction operations in these vessels hitherto necessitating use of known shaking ladles the cost of which is quite substantial.

It is an object of the invention to produce the rotary movement known per se of the smelt when using shaking ladles in a simple manner also in vessels having only a single pivotal axis, e.g. in a steel converter without bottom openings, in order in this manner to obtain the advantages of a shaking ladle, without having to use it. A special example for this would be the production of a rotary movement of the smelt in overhead tuyere converters, which are supplied with oxygen from above by means of a lance.

According to the present invention this problem is solved by the fact that there is imparted to the vessel a periodical swinging movement about a horizontal or substantially horizontal pivotal axis with a frequency which lies somewhat above the natural vibration frequency of the liquid slopping to and fro, means being used which initially impart to the liquid—additional to the already existing reciprocating movement—a rotary movement about the vessel axis, which in the progressive course is maintained by the pivotal movement of the vessel. If the vessel carries out such a pivotal movement, then in most cases an angular deflection to both sides of 8° and less suffices. In this way it is obtained that even in a vessel having only one pivotal axis, e.g. in a steel converter, the liquid contained therein, e.g. a metal smelt, can be caused to rotate about the vessel axis without necessitating imparting a circular movement to the vessel, e.g. the converter, as is necessary in the case of a shaking ladle. In this way it is possible to use existing overhead tuyere converters for this purpose. This also entails the further advantage that it is possible also for large smelting masses to be caused to rotate about the vessel axis, which in the case of a shaking ladle is not possible with such weights owing to the considerable loading of the eccentrics on which the shaking ladles are mounted.

As means for producing the rotary movement of the liquid about the vessel axis it is possible in accordance with the invention to use the cross-sectional shape of the vessel, which is asymmetrical relative to the pivotal axis. With such an asymmetrical cross-section of the vessel, smelting masses differing in size are moving on both sides of the pivotal axis. The result of this is that the smelting mass is caused to rotate about the vessel axis, which then in progressive course is maintained by the periodical reciprocating movement of the vessel.

As means for producing the initial rotary movement of the liquid about the vessel axis it is possible to use also other means, e.g. an electro-magnetic force field, which on creating the rotary movement can be switched off again.

The invention will be described further, by way of example, with reference to the accompanying drawings, in which:

FIG. 1 is an axial longitudinal section through the converter without magnet;
FIG. 2 is a section taken on line II of FIG. 1, but including a showing of a rotation-producing magnet; and
FIG. 3 is a view simlar to FIG. 2, but of a different embodiment.

The vessel 1 shown in FIG. 1 has the shape of a converter with an upper opening 2 and a pivotal axis $y$, about which the converter is adapted to carry out pivoting movements at an angle to either side. A lance 3 is inserted in the opening 2, through which lance oxygen may be blown on to the bath 4.

In the embodiment shown in FIG. 3 the circular cross-section of the interior of the converter is flattened by an insert 5 so that on both sides of the pivotal axis $y$ a cross-sectional asymmetry is formed.

In the embodiment shown in FIG. 2 an electromagnet 6 is arranged around the outside of the converter 1, which magnet, when switched on, produces a rotary field which imparts to the smelt mass 4 a circulating movement.

At the beginning of the new process the converter 1 is caused to execute a pivotal movement about the axis $y$. In this case the converter is caused to carry out deflecting movements of 8° and less to either side. With increasing speed the converter is brought to a frequency which lies somewhat higher than the resonance frequency of the reciprocating smelt in the vessel. When using the example in accordance with FIG. 3, the phenomenon occurs that owing to the asymmetry of the cross-section of the vessel, the smelting masses agitated in the vessels are caused to rotate like in a shaking ladle. Once the rotary movement of the smelt mass has been produced, it is constantly and progressively maintained by the reciprocating movement of the converter, without requiring any rotary impulses by extraneous means.

A different means for producing initial rotary movements is shown in FIG. 2. Herein an electromagnet 6 is used which produces a rotary field. This rotary field causes the smelt mass 4 to carry out a rotary movement. Once this rotary movement has been produced, it is possible for the electric magnet to be switched off, because the progressive rotary impulses emanate from the reciprocating movement of the smelt mass. The rotary movement in this case is also maintained without requiring additional extraneous means, which is constituted by the electromagnet.

In this process just as in a shaking ladle a wall wave is produced which carries out the mixing in the converter content per se or with other substances.

The invention is also applicable in such vessels which permit a parallel movement in a plane relative to themselves. In these cases it is also possible for the rotary movement of the vessel contents to be produced about the vessel axis.

We claim:
1. A process for subjecting a liquid contained in a vessel to an agitation of such nature as to effect stirring of the liquid, comprising the steps of acting upon the liquid in the vessel with a first instrumentality to impart to the liquid a rotary movement about the vessel axis;

terminating the action of said first instrumentality and imparting to said liquid with a second instrumentality a periodic oscillating movement only in a vertical plane in substantially horizontal direction to thereby sustain said rotary movement.

2. A process for subjecting a liquid contained in a vessel to an agitation of such nature as to effect stirring of the liquid, comprising the steps of imposing on the liquid in the vessel a rotary movement about the vessel axis; terminating imposition of such rotary movement; and imparting to the vessel a periodic oscillating movement only in a substantially vertical plane and in substantially horizontal direction to thereby at least assist in maintaining said rotary movement.

3. A process as defined in claim 2, wherein the step of imposing on the liquid a rotary movement comprises subjecting such liquid to the influence of auxiliary rotation-producing means for the purpose of causing such rotary movement.

4. A process as defined in claim 3, wherein the step of terminating imposition of said rotary movement by such auxiliary rotation-producing means takes place upon imparting of said oscillating movement to the vessel.

5. A process as defined in claim 2, wherein said oscillating movement is a translatory movement.

6. A process as defined in claim 2, wherein said oscillating movement is a wobbling motion about the axis of the vessel.

7. A process for subjecting a body of liquid confined in an enclosed space to an agitation of such nature as to effect stirring of the liquid, comprising the steps of subjecting the body of liquid to the action of a first force which imparts to the liquid a rotary motion about a predetermined axis; terminating the action of said first force when the body of liquid rotates about said axis; and subjecting the rotating body of liquid not later than upon termination of said first force to the action of a second force which imparts to the rotating body a reciprocatory motion in a direction transversal to said axis to thereby sustain the rotary motion initially imparted by said first force.

8. A process as defined in claim 7, wherein said reciprocatory movement is an oscillatory movement.

9. A process as defined in claim 8, wherein said oscillatory movement is a periodic movement.

10. A process as defined in claim 8, wherein said liquid has a natural frequency of oscillation, and wherein said oscillatory movement imparted by said second force is a periodic movement having a frequency exceeding said natural frequency by a value of at most fifteen percent thereof.

11. A process as defined in claim 10, wherein said periodic oscillatory movement is a wobbling movement about said axis.

References Cited

UNITED STATES PATENTS

| | | | |
|---|---|---|---|
| 864,784 | 9/1907 | Hanitzsch | 259—74 X |
| 2,806,687 | 9/1957 | Graef | 266—36 |
| 3,030,081 | 4/1962 | Wilson et al. | 259—72 |
| 3,031,177 | 4/1962 | Hofmeister | 266—36 |

ROBERT W. JENKINS, *Primary Examiner.*

M. L. FAIGUS, *Assistant Examiner.*